United States Patent
Cotter et al.

(10) Patent No.: US 10,814,912 B2
(45) Date of Patent: Oct. 27, 2020

(54) TRAILER BACKUP ASSIST SYSTEM HAVING ADVANCED USER MODE WITH SELECTABLE HITCH ANGLE LIMITS

(71) Applicant: Ford Global Technologies, LLC, Dearborn, MI (US)

(72) Inventors: Jeffrey Cotter, Royal Oak, MI (US); Erick Michael Lavoie, Dearborn, MI (US); Tyler Daavettila, Howell, MI (US); Robert Bell, New Hudson, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 16/202,983

(22) Filed: Nov. 28, 2018

(65) Prior Publication Data

US 2020/0164919 A1    May 28, 2020

(51) Int. Cl.
  *B62D 13/06*    (2006.01)
  *B62D 15/02*    (2006.01)
  *B60R 1/00*     (2006.01)
  *B60R 11/04*    (2006.01)

(52) U.S. Cl.
  CPC .......... *B62D 13/06* (2013.01); *B62D 15/025* (2013.01); *B60R 1/003* (2013.01); *B60R 11/04* (2013.01); *B60R 2300/8086* (2013.01)

(58) Field of Classification Search
  CPC ...... B62D 13/06; B62D 15/025; B60R 1/003; B60R 11/04; B60R 2300/8086
  USPC .......................................................... 701/41
  See application file for complete search history.

(56) References Cited

U.S. PATENT DOCUMENTS

| | | | |
|---|---|---|---|
| 3,542,390 A | 11/1970 | Fikse | |
| 3,756,624 A | 9/1973 | Taylor | |
| 3,860,257 A | 1/1975 | Mesly | |
| 4,042,132 A | 8/1977 | Bohman et al. | |
| 4,320,267 A | 3/1982 | Greve et al. | |
| 4,735,432 A | 4/1988 | Brown | |
| 4,752,080 A | 6/1988 | Rogers | |
| 4,848,499 A | 7/1989 | Martinet et al. | |

(Continued)

FOREIGN PATENT DOCUMENTS

| | | |
|---|---|---|
| CN | 202159367 U | 3/2012 |
| DE | 3931518 A1 | 4/1991 |

(Continued)

OTHER PUBLICATIONS

Haviland, G S, "Automatic Brake Control For Trucks—What Good Is It?", TRID, Society of Automotive Engineers, Sep. 1968, 1 pg.

(Continued)

*Primary Examiner* — Yazan A Soofi
(74) *Attorney, Agent, or Firm* — Raymond Coppiellie; Price Heneveld LLP

(57) ABSTRACT

A backup assist system for a vehicle reversing a trailer includes a controller receiving a driver control signal and outputting a vehicle backing steering command based on the control signal and limited by one of a first angle limit corresponding with a calculated maximum controllable angle and a second angle limit at a maneuverability threshold below the maximum controllable angle. The system further includes an interface outputting an indication of the one of the first and second angle limits.

20 Claims, 13 Drawing Sheets

(56) References Cited

U.S. PATENT DOCUMENTS

| | | |
|---|---|---|
| 4,947,097 A | 8/1990 | Tao |
| 5,001,639 A | 3/1991 | Breen |
| 5,108,158 A | 4/1992 | Breen |
| 5,246,242 A | 9/1993 | Penzotti |
| 5,247,442 A | 9/1993 | Kendall |
| 5,270,689 A | 12/1993 | Hermann |
| 5,359,165 A | 10/1994 | Leveque et al. |
| 5,430,261 A | 7/1995 | Malone |
| 5,436,413 A | 7/1995 | Katakami |
| 5,558,350 A | 9/1996 | Kimbrough et al. |
| 5,586,814 A | 12/1996 | Steiner |
| 6,042,196 A | 3/2000 | Nakamura et al. |
| 6,056,371 A | 5/2000 | Lin et al. |
| 6,154,201 A | 11/2000 | Levin et al. |
| 6,292,094 B1 | 9/2001 | Deng et al. |
| 6,351,698 B1 | 2/2002 | Kubota et al. |
| 6,389,342 B1 | 5/2002 | Kanda |
| 6,409,288 B2 | 6/2002 | Yoshida et al. |
| 6,494,476 B2 | 12/2002 | Masters et al. |
| 6,498,977 B2 | 12/2002 | Wetzel et al. |
| 6,567,731 B2 | 5/2003 | Chandy |
| 6,636,197 B1 | 10/2003 | Goldenberg et al. |
| 6,704,653 B2 | 3/2004 | Kuriya et al. |
| 6,750,406 B2 | 6/2004 | Komatsu et al. |
| 6,838,979 B2 | 1/2005 | Deng et al. |
| 6,854,557 B1 | 2/2005 | Deng et al. |
| 7,032,705 B2 | 4/2006 | Zheng et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,165,820 B2 | 1/2007 | Rudd, III |
| 7,219,913 B2 | 5/2007 | Atley |
| 7,310,084 B2 | 12/2007 | Shitanaka et al. |
| 7,319,927 B1 | 1/2008 | Sun et al. |
| 7,546,191 B2 | 6/2009 | Lin et al. |
| 7,690,737 B2 | 4/2010 | Lu |
| 7,706,944 B2 | 4/2010 | Tanaka et al. |
| 7,715,953 B2 | 5/2010 | Shepard |
| 7,793,965 B2 | 9/2010 | Padula |
| 7,969,326 B2 | 6/2011 | Sakakibara |
| 8,010,253 B2 | 8/2011 | Lundquist |
| 8,033,955 B2 | 10/2011 | Farnsworth |
| 8,036,792 B2 | 10/2011 | Dechamp |
| 8,108,116 B2 | 1/2012 | Mori et al. |
| 8,138,865 B2 | 3/2012 | North et al. |
| 8,139,109 B2 | 3/2012 | Schmiedel et al. |
| 8,170,726 B2 | 5/2012 | Chen et al. |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,374,749 B2 | 2/2013 | Tanaka |
| 8,430,792 B2 | 4/2013 | Noll |
| 8,469,125 B2 | 6/2013 | Yu et al. |
| 8,519,948 B2 | 8/2013 | Cruz-Hernandez et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,786,417 B2 | 7/2014 | Holmen et al. |
| 8,798,860 B2 | 8/2014 | Dechamp |
| 8,909,426 B2 | 12/2014 | Rhode et al. |
| 8,930,140 B2 | 1/2015 | Trombley et al. |
| 9,102,271 B2 | 8/2015 | Trombley et al. |
| 9,108,598 B2 | 8/2015 | Headley |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,227,474 B2 | 1/2016 | Liu |
| 9,229,453 B1 | 1/2016 | Lee |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,500,497 B2 | 11/2016 | Lavoie et al. |
| 9,616,923 B2 | 4/2017 | Lavoie et al. |
| 9,840,278 B2 | 12/2017 | Lavoie et al. |
| 2001/0037164 A1 | 11/2001 | Hecker |
| 2001/0052434 A1 | 12/2001 | Ehrlich et al. |
| 2004/0222881 A1 | 11/2004 | Deng et al. |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0236201 A1 | 10/2005 | Spannheimer et al. |
| 2005/0236896 A1 | 10/2005 | Offerle et al. |
| 2006/0103511 A1 | 5/2006 | Lee et al. |
| 2006/0142936 A1 | 6/2006 | Dix |
| 2007/0027581 A1 | 2/2007 | Bauer et al. |
| 2007/0198190 A1 | 8/2007 | Bauer et al. |
| 2008/0177443 A1 | 7/2008 | Lee et al. |
| 2008/0231701 A1 | 9/2008 | Greenwood et al. |
| 2009/0082935 A1 | 3/2009 | Leschuk et al. |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0152989 A1 | 6/2010 | Smith et al. |
| 2011/0087398 A1 | 4/2011 | Lu et al. |
| 2012/0041658 A1 | 2/2012 | Turner |
| 2012/0095649 A1 | 4/2012 | Klier et al. |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0148748 A1 | 6/2013 | Suda |
| 2013/0179038 A1 | 7/2013 | Goswami et al. |
| 2013/0268160 A1 | 10/2013 | Trombley et al. |
| 2013/0313351 A1 | 11/2013 | Lavoie |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0121930 A1 | 5/2014 | Allexi et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1* | 9/2014 | Aich ............... B60W 50/0097 348/113 |
| 2014/0267689 A1 | 9/2014 | Lavoie |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |

(56) References Cited

U.S. PATENT DOCUMENTS

| | | |
|---|---|---|
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0052548 A1 | 2/2016 | Singh et al. |
| 2016/0059888 A1 | 3/2016 | Bradley et al. |
| 2016/0129939 A1 | 5/2016 | Singh et al. |
| 2017/0101130 A1* | 4/2017 | Lavoie ............ B62D 1/02 |
| 2017/0106865 A1* | 4/2017 | Lavoie ............ B62D 13/06 |
| 2017/0259850 A1 | 9/2017 | Yamashita et al. |
| 2017/0313351 A1* | 11/2017 | Lavoie ............ B64C 31/06 |
| 2018/0111621 A1* | 4/2018 | Buss ............ B62D 13/06 |
| 2020/0110402 A1* | 4/2020 | Golgiri ............ G05D 1/0055 |

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1569073 A2 | 8/2005 |
| EP | 1653490 A1 | 3/2006 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |
| WO | 2015187467 A1 | 12/2015 |

OTHER PUBLICATIONS

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biometics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

* cited by examiner

TRAILER BACKUP ASSIST SYSTEM HAVING ADVANCED USER MODE WITH SELECTABLE HITCH ANGLE LIMITS

FIELD OF THE DISCLOSURE

The present invention generally relates to steering assist technologies in vehicles and, more particularly, to a trailer backup assist system having normal and advanced modes corresponding to parameters requiring shorter and longer turn recovery distances.

BACKGROUND OF THE DISCLOSURE

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc.). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

Therefore, an approach for backing a trailer that provides a simple human machine interface and that overcomes other shortcomings of known trailer backup assist systems may be advantageous, desirable or useful.

SUMMARY OF THE DISCLOSURE

According to one aspect of the present disclosure, a backup assist system for a vehicle reversing a trailer includes a controller receiving a driver control signal and outputting a vehicle backing steering command based on the control signal and limited by one of a first angle limit corresponding with a calculated maximum controllable angle and a second angle limit at a maneuverability threshold below the maximum controllable angle. The system further includes an interface outputting an indication of the one of the first and second angle limits.

Embodiments of this aspect can include any one or a combination of the following features:

- the system further includes an input receiving a backing control command from a driver and outputting the driver control signal based thereon on the backing control command;
- the control signal includes a direction and an amplitude and the controller interprets the amplitude as a curvature command in the direction indicated by the control signal;
- the controller causes the system to selectively operate in a normal mode wherein the backing steering command is limited by the second angle limit and an advanced mode wherein the backing steering command is limited by the first angle limit;
- the controller receives, by way of the interface, a user selection of one of the normal mode and the advanced mode;
- the interface presents softbuttons corresponding with each of the normal mode and the advanced mode and outputs a selection of one of the normal mode or the advanced mode to the controller upon an input corresponding with the respective softbutton.
- the controller initially determines whether operation of the system in the advanced mode is desirable based on predetermined criteria and the interface indicates that the softbutton corresponding with the advanced mode is not selectable when the controller initially determines that operation of the system in the advanced mode is not desirable;
- the interface presents an indication of a current operation mode from either of the normal mode and the advanced mode and the controller receives a selection of the other of the normal mode and the advanced mode by at least one physical control in the vehicle;
- the second limit is adjustable by a user within a predetermined range and the interface presents an indication of the second limit and respective softbuttons for raising or lowering the limit within the predetermined range;
- the controller restricts operation of the system to within the normal mode unless the trailer meets at least one predetermined criterion;
- the predetermined criterion is one of a length of the trailer being above a threshold conventional trailer length or a type of the trailer corresponding with a gooseneck trailer;
- when the system operates in the normal mode and an initial vehicle-trailer angle is above the second angle limit, the interface presents a prompt to drive the vehicle in a forward direction or to select the advanced mode;
- when an initial vehicle-trailer angle is above the second angle limit, the control system interface selects to operate in the advanced mode; and
- the controller designates one of the normal mode and the advanced mode as a default mode that it selectively operates in upon activation of the system, the designation being determined by a user via the interface.

According to another aspect of the present disclosure, a backup assist system for a vehicle reversing a trailer includes a controller receiving a driver control signal and operating in one of a normal mode and an advanced mode. When operating in the advanced mode the controller outputs a vehicle backing steering command based on the control signal and limited by a first angle limit corresponding with a calculated maximum controllable angle, and when in the normal mode the controller outputs the vehicle backing steering command based on the control signal and limited by a second angle limit at a maneuverability threshold below the maximum controllable angle. The system further includes an interface outputting an indication of the one of the first and second angle limits.

According to another aspect of the present disclosure, a method for assisting in reversing a vehicle-trailer combination includes receiving a driver control signal and controlling reversing the vehicle-trailer combination in one of a normal mode and an advanced mode. When in the advanced mode, controlling reversing includes outputting a vehicle backing steering command based on the control signal and limited by a first angle limit corresponding with a calculated maximum controllable angle and, when in the normal mode, controlling reversing includes outputting the vehicle backing steering command based on the control signal and limited by a second angle limit at a maneuverability threshold below the maximum controllable angle. The method further includes presenting an indication of the one of the first and second angle limits to a driver of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
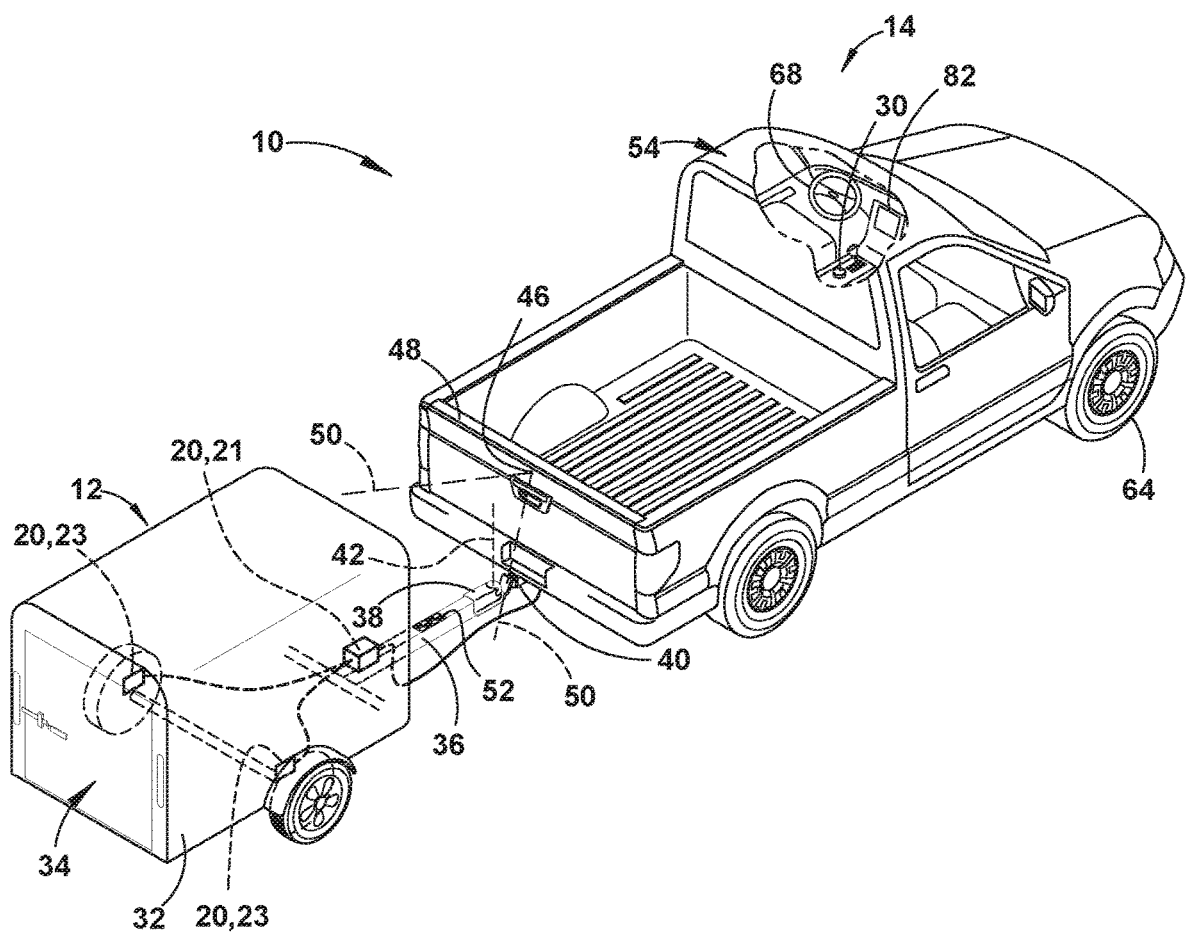
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-16, reference numeral 10 generally designates a trailer backup assist system for controlling a backing path 26 of a trailer 12 attached to a vehicle 14 by allowing a driver of the vehicle 14 to specify a desired curvature κ of the backing path 26 of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10 according to such an embodiment may also include a vehicle sensor system 16 that generates a vehicle yaw rate $\omega_1$ and a vehicle speed $v_1$. The controller 28 of the trailer backup assist system 10 may thereby estimates a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may include a hitch angle sensor 44, such as a vision-based system that employs a camera 46 on the vehicle 14 to monitor a target 52 on the trailer 12 to determine the hitch angle γ and thereby further increase reliability of the overall estimated hitch angle γ.

With respect to the general operation of the trailer backup assist system 10, a steering input device 18 may be provided, such as a rotatable, or otherwise moveable, knob 30, for a driver to provide the desired curvature κ of the trailer 12. As such, the steering input device 18 may be operable between a plurality of selections, such as successive rotated positions of a knob 30, that each provide an incremental change to the desired curvature κ of the trailer 12. Upon inputting the desired curvature κ, the controller 28 may generate a steering command for the vehicle 14 to guide the trailer 12 on the desired curvature κ based on the estimated hitch angle γ and a kinematic relationship between the trailer 12 and the vehicle 14. Therefore, the accuracy of the hitch angle estimation is critical to operating the trailer backup assist system 10. However, it is appreciated that such a system 10 for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path 26 of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle and may have various shapes and sizes configured for different loads and items, such as a boat trailer or a flatbed trailer.

Figure 2:
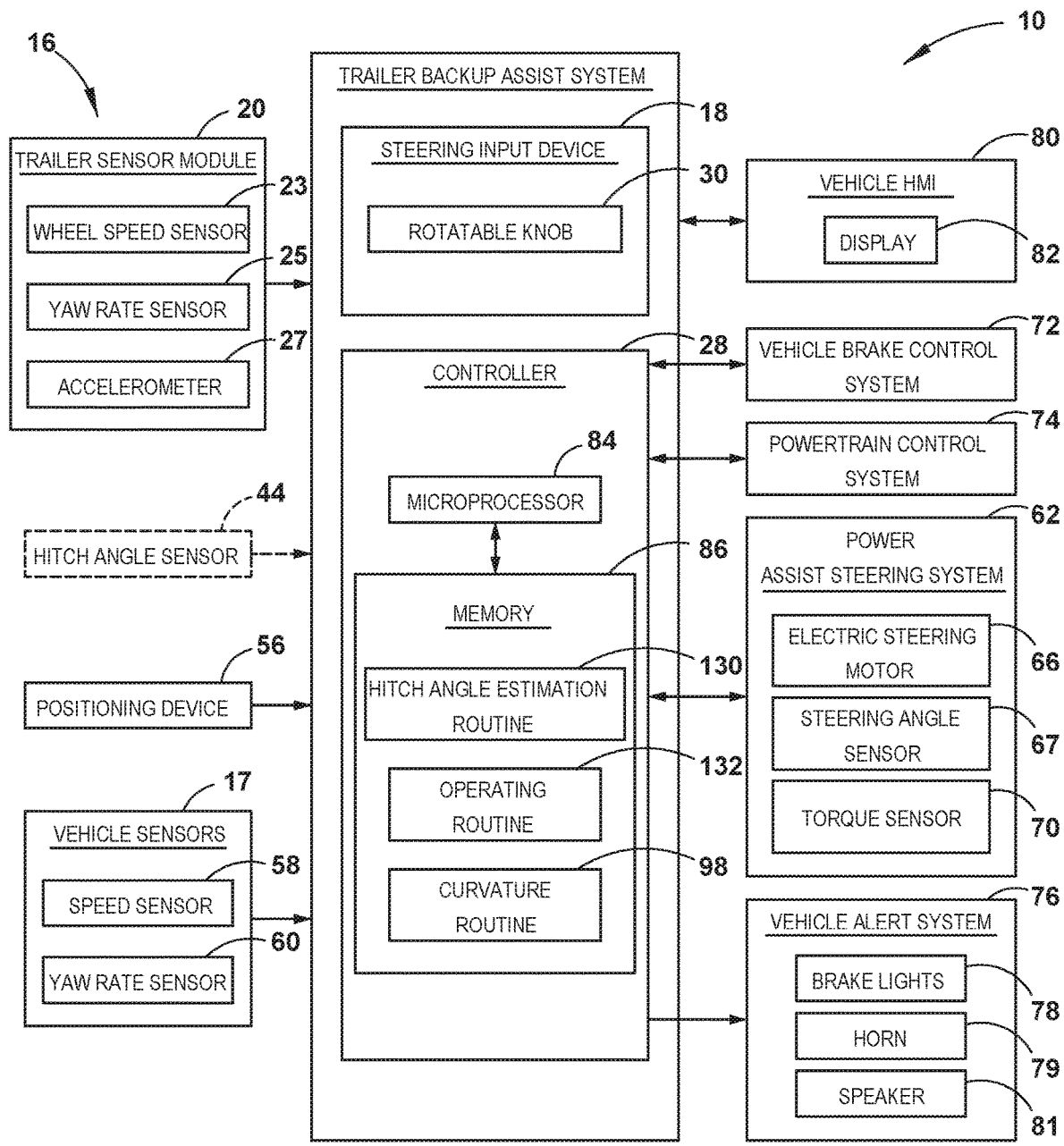
FIG. 2 is a block diagram illustrating one embodiment of the trailer backup assist system having a steering input device, a curvature controller, and a trailer braking system.

Referring to FIGS. 1 and 2, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction 22 of the trailer 12 or arranged parallel with the longitudinal and lateral directions of the trailer 12, to generate a more robust acceleration signal. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle 14 and trailer 12 status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate $\omega_1$ of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller 28 of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature κ of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Figure 5:
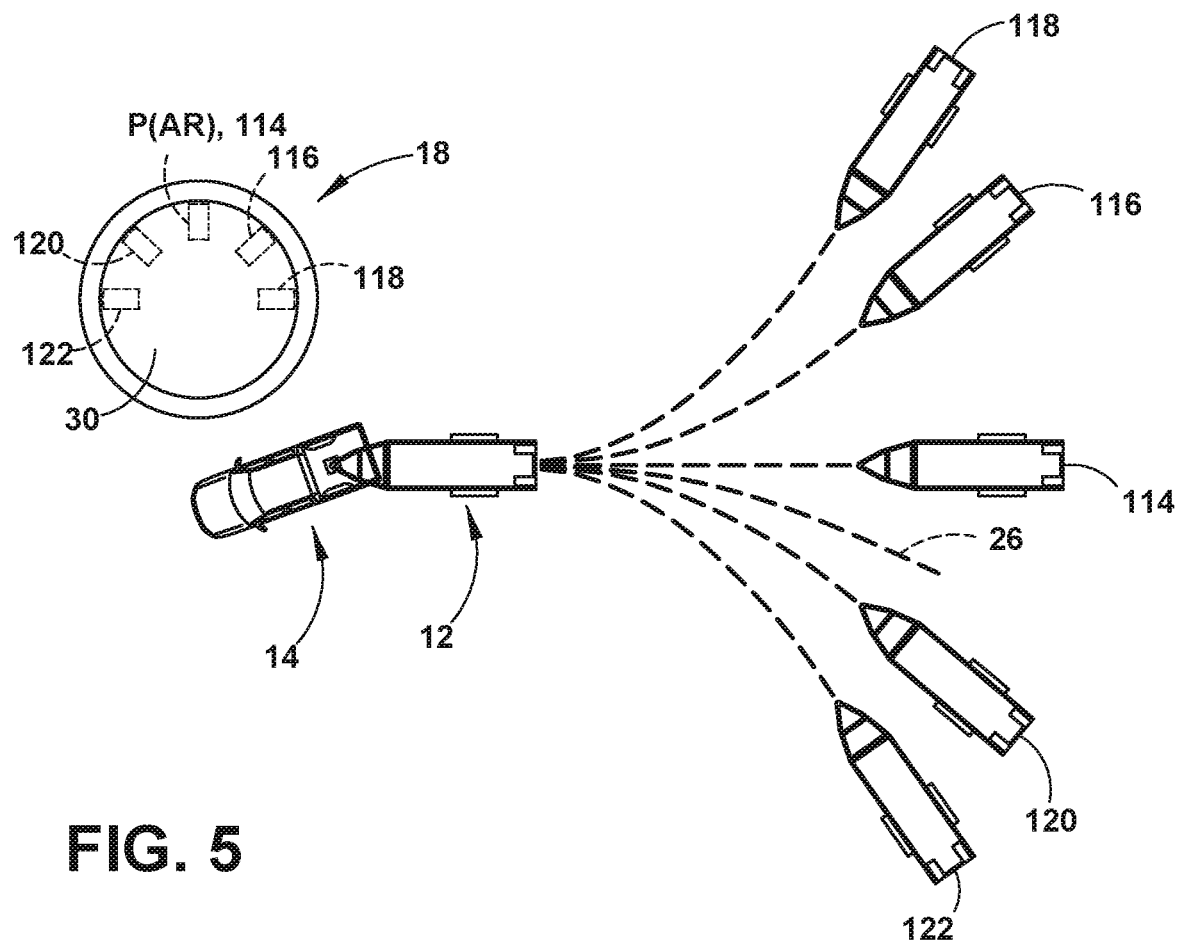
FIG. 5 is a plan view of another embodiment of a rotatable knob for selecting a desired curvature of a trailer and a corresponding schematic diagram illustrating a vehicle and a trailer with various trailer curvature paths correlating with desired curvatures that may be selected.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature κ (FIG. 5). It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate $\omega_1$, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle γ on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path 26 of travel of the trailer 12 for the controller 28 to process and generate steering commands. More specifically, the steering input device 18 may provide a selection or positional information that correlates with a desired curvature κ of the desired backing path 26 of travel of the trailer 12. Also, the trailer steering commands provided by the steering input device 18 can include information relating to a commanded change in the path of travel, such as an incremental change in the desired curvature κ, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature κ. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature κ or other information defining a desired backing path 26, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, a trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
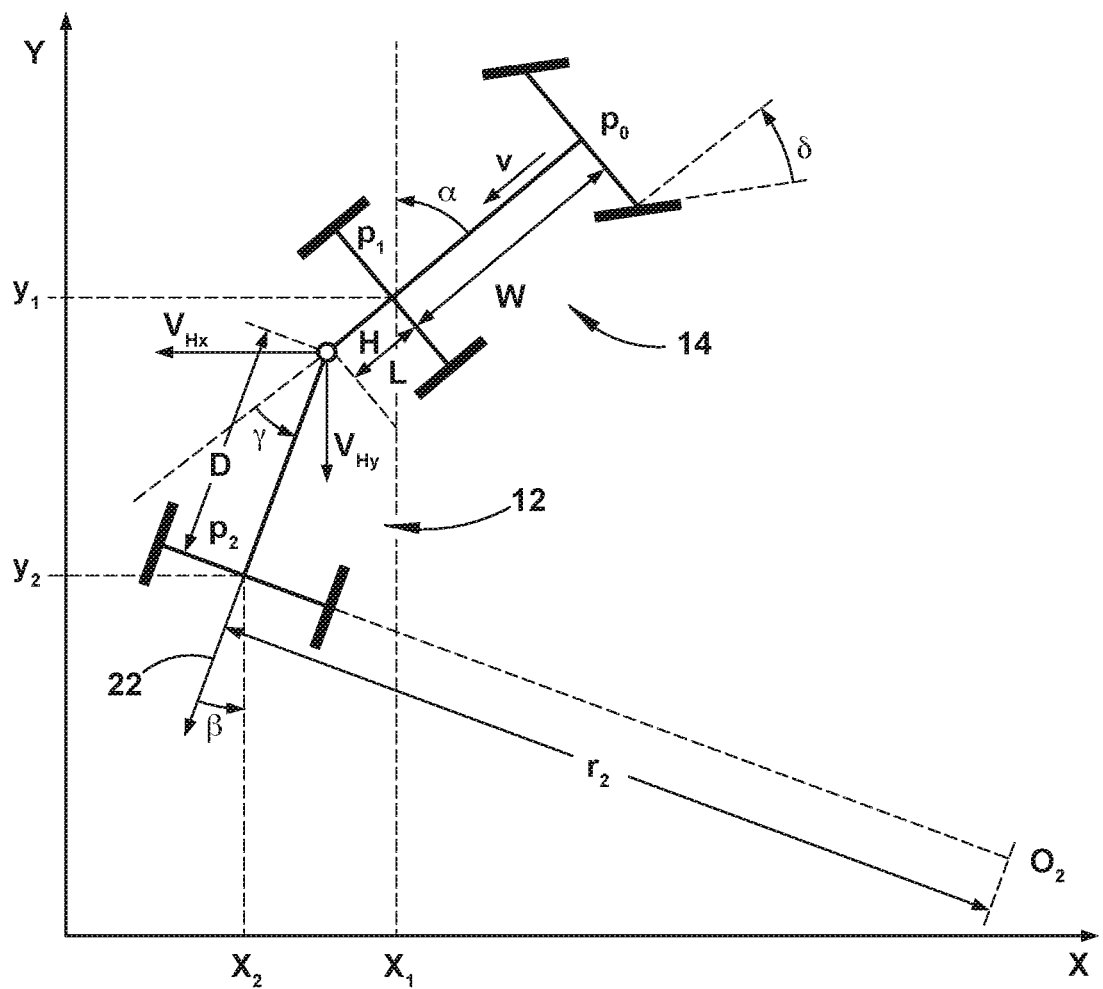
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is the trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. κ is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $κ_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L (also referred to herein as the trailer length) between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue 36 configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue 36 configuration.

Figure 4:
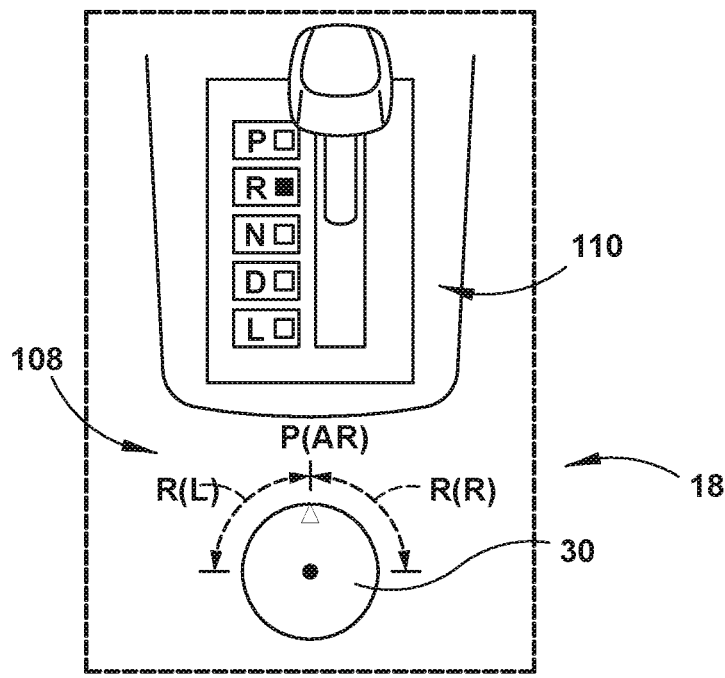
FIG. 4 is a plan view of a steering input device having a rotatable knob for operating the trailer backup assist system, according to one embodiment.

Referring now to FIG. 4, one embodiment of the steering input device 18 is illustrated disposed on a center console 108 of the vehicle 14 proximate a shifter 110. In this embodiment, the steering input device 18 includes a rotatable knob 30 for providing the controller 28 with the desired curvature κ of the trailer 12. More specifically, the angular position of the rotatable knob 30 may correlate with a curvature input C, such that rotation of the knob 30 to a different angular position provides a different commanded curvature κ with an incremental change based on the amount of rotation and, in some embodiments, a normalized rate, as described in greater detail herein.

The rotatable knob 30, as illustrated in FIG. 4, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one R(L) of the opposing rotational ranges of motion R(L), R(R). To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature κ output to the controller 28. The at-rest position P(AR) of the knob 30 corresponds to a signal indicating that the vehicle 14 should be steered such that the trailer 12 is backed along a substantially straight backing path 114 (FIG. 5) corresponding with a zero trailer curvature request from the driver), as defined by the longitudinal direction 122 of the trailer 12 when the knob 30 was returned to the at-rest position P(AR). A maximum clockwise and anti-clockwise position of the knob 30 (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 5, a driver can turn the rotatable knob 30 to provide a desired curvature κ, within the available ranges of directional positions, while the driver of the vehicle 14 backs the trailer 12. In the illustrated embodiment, the rotatable knob 30 rotates about a central axis between a center or middle position 114 corresponding to a substantially straight backing path 26 of travel (i.e. zero curvature), as defined by the longitudinal direction 122 of the trailer 12, and various rotated positions 116, 118, 120, 122 on opposing sides of the middle position 114, commanding a desired curvature κ (which may be referred to as the "curvature command") corresponding to a radius of the desired backing path 26 of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 6:
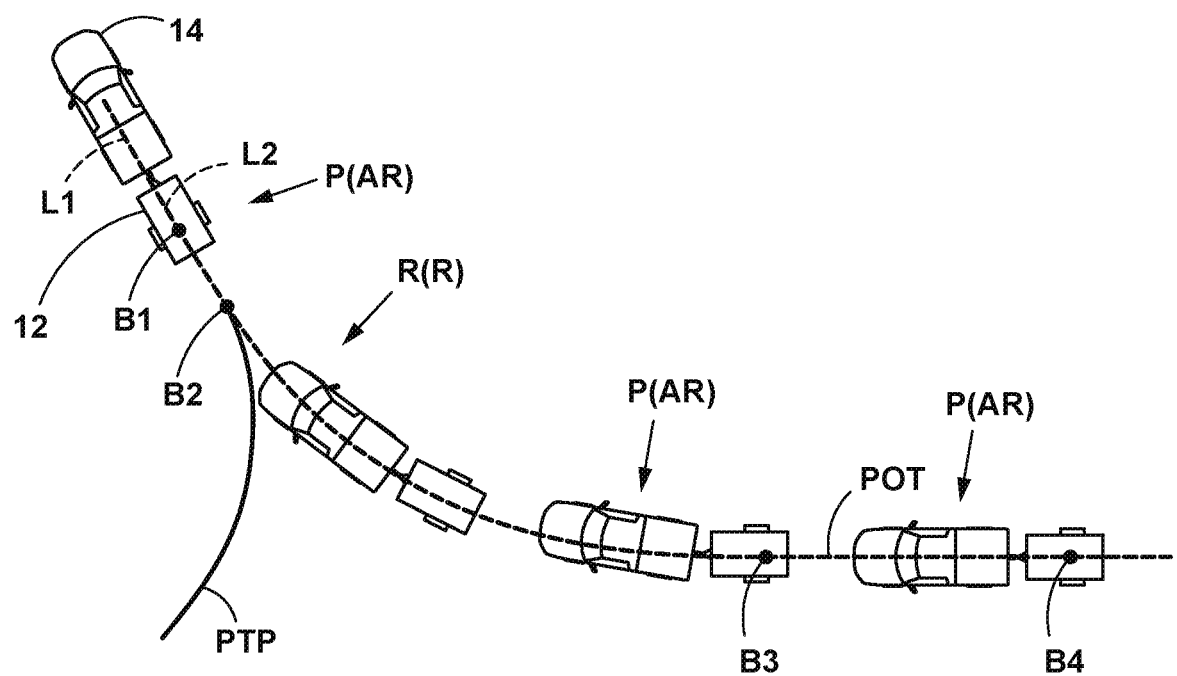
FIG. 6 is a schematic diagram showing a backup sequence of a vehicle and a trailer implementing various sequential curvature selections with the trailer backup assist system, according to one embodiment.

Referring to FIG. 6, an example of using the steering input device 18 for dictating a curvature κ of a desired backing path 26 of travel (POT), or portion thereof, of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axes L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 (FIG. 4) of the trailer backup steering input device 18

(FIG. 4) remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 122 (FIG. 5) of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 as necessary for causing the trailer 12 to be steered to the right as a function of an amount of rotation of the rotatable knob 30 with respect to the at-rest position P(AR), a rate movement of the knob 30, and/or a direction of movement of the knob 30 with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary to cause the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 6, in order to activate the trailer backup assist system 10, the driver interacts with the trailer backup assist system 10 and the system 10 automatically steers as the driver reverses the vehicle 14. As discussed above, the driver may command the trailer backing path by using a steering input device 18 and the controller 28 may determine the vehicle steering angle to achieve the desired curvature κ, whereby the driver controls the throttle and brake while the trailer backup assist system 10 controls the steering.

Figure 7:
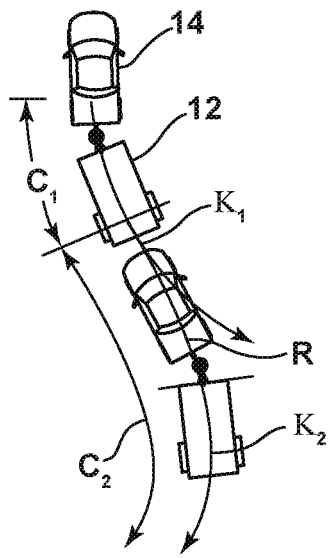
FIG. 7 is a schematic view showing a vehicle backing a trailer along a path including multiple curvatures with a recovery period therebetween.

Referring now to FIG. 7, a schematic view of a vehicle 14 reversing a trailer 12 is shown during a sequence of backing maneuvers implemented using a particular embodiment of the steering input device 18 (FIG. 5), including a rotatable knob 30 (FIG. 5), as described above. In this sequence, it is shown that upon initially reversing under a particular curvature command $C_1$ that corresponds with a curvature $\kappa_1$ of the combined trailer 12 and vehicle 14 (as implemented by system 10 by controlling the steering angle δ of the wheels 64 (FIG. 1) of vehicle 14, as described above), the combined trailer 12 and vehicle 14 will go through a recovery path R of a certain distance after a second curvature command $C_2$ is entered by the driver using knob 30. As shown, even when the subsequent curvature command $C_2$ is in a direction opposite the initial command $C_1$, a portion of the recovery path R will continue in the direction of $C_1$ as the path R transitions from the initially-commanded curvature $\kappa_1$ corresponding with command $C_1$ to reach the second commanded curvature $\kappa_2$ that corresponds with command $C_2$. Overall, the distance needed for the combined trailer 12 and vehicle 14 combination to achieve the second commanded curvature $\kappa_2$ represents a lag between the driver imputing the second curvature command $C_2$ and the corresponding curvature $\kappa_2$ being reached.

Figure 8:
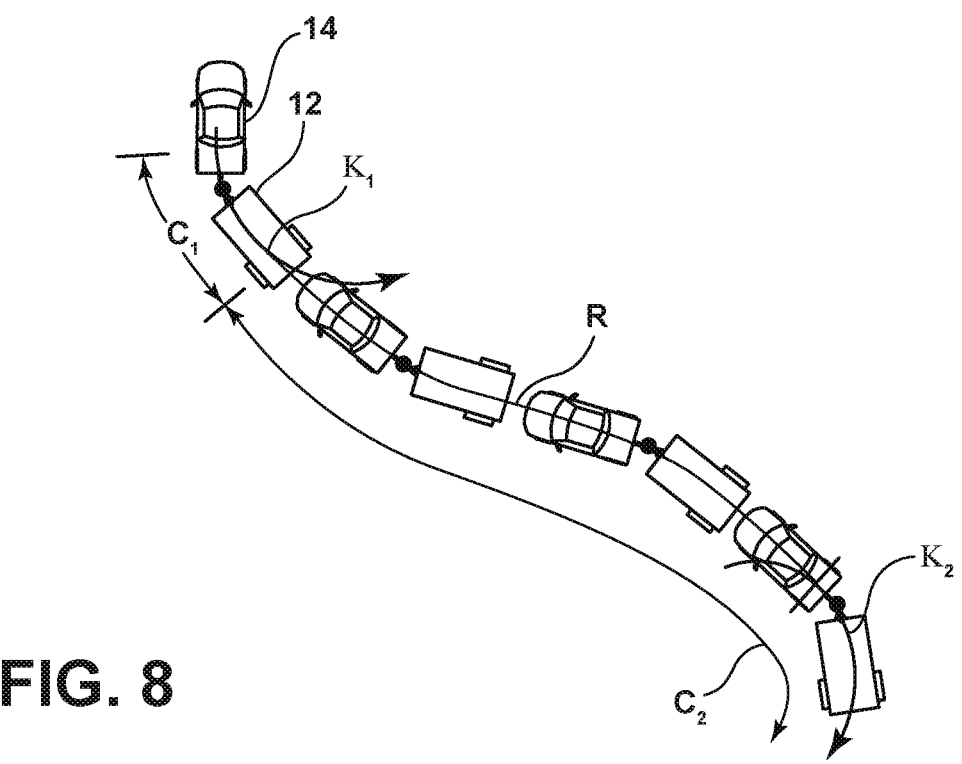
FIG. 8 is a further schematic view showing a vehicle backing a trailer along an alternative path including multiple curvatures with an extended recovery period therebetween.

As further shown in FIG. 8, when the initially-commanded curvature $\kappa_1$, corresponding to the initial curvature command $C_1$, is relatively tight (i.e. such that a high hitch angle γ is maintained), a relatively longer recovery path R is traversed after entering a second curvature command $C_2$ in a direction opposite the first curvature command $C_1$, a significant portion of which may initially be in the direction of the first curvature command $C_1$. This effect is generally even more pronounced as trailer length D increases, with relatively longer trailers traversing a relatively long recovery path R (such as at least three lengths of vehicle 14). This can become a problem if the driver needs to change the direction of the trailer 12 multiple times within a limited amount of lateral space relative to the vehicle staring point or commands an initial curvature $\kappa_1$ without enough overall room to recover without requiring that vehicle 14 be driven forward.

To potentially help a driver avoid situations where there is inadequate room to recover from a commanded curvature κ, system 10 may implement a "normal" mode where relatively tighter curvatures κ requiring, for example, a hitch angle γ above a certain limit, are not implemented when commanded by the user via knob 30 to provide easier turn recovery to change the direction of the trailer 12 relative to vehicle 14. To allow the user an increased level of control in reversing trailer 12, particularly when a tight curvature is desired and the user observes that adequate recovery room is available of that no recovery is needed, system 10 may provide an "advanced" mode where a tighter curvature resulting in a higher hitch angle γ is allowed, up to a predetermined safe angle away from the maximum controllable angle $\gamma_{max}$ for the particular vehicle 14 and trailer 12 combination. In general, the maximum controllable angle is determined by the equation:

$$\gamma_{max} = \cos^{-1}\left(\frac{-LD\tan^2(\delta_m) \pm W\sqrt{W^2 + (L^2 - D^2)\tan^2(\delta_m)}}{L^2\tan^2(\delta_m) + W^2}\right)$$

where:

$\delta_m$ is the maximum steering angle of vehicle 14.

The advanced limit is thusly determined based on the maximum controllable hitch angle $\gamma_{max}$, which may be determined by controller 28 using known fixed data related to vehicle 14 and/or input or measured data related to trailer 12. As the maximum controllable hitch angle $\gamma_{max}$ is determined as a maximum controllable increasing hitch angle γ, the advanced limit is set at a hitch angle lower than the maximum controllable hitch angle $\gamma_{max}$ by an amount determined to account for the overall responsiveness of system 10 within the context of controller 28 and vehicle 14 to allow the system 10 to react, such as by controlling the vehicle 14 brake system 72 and/or steering system 62, to prevent the hitch angle γ from reaching or exceeding the maximum controllable hitch angle $\gamma_{max}$, given the unstable nature of most hitching arrangements. In various examples the advanced mode limit may be set at a value between 1 and 5 degrees less than the determined jackknife angle or may be set at a predetermined percentage of the maximum controllable hitch angle $\gamma_{max}$ (e.g., between 90% and 98%). In general, the advanced angle limit can be set at the same fixed angle from, or a fixed overall percentage of, the maximum controllable hitch angle $\gamma_{max}$ regardless of the length D of trailer 12 and a corresponding advanced curvature limit can be determined as resulting in a steady-state angle at the maximum controllable hitch angle $\gamma_{max}$.

Referring to FIGS. 7 and 8, and as can be understood based on the above description of the kinematic model underlying curvature routine 98 (FIG. 2), trailers 12 with a greater length D have comparatively greater recovery periods, which may be measured in time (recovery time) or distance (recovery distance) for similar curvatures κ. For example, when a fifth-wheel, gooseneck or long conventional hitch trailer 12 is reversed in a curved path (such as path $C_1$ in FIG. 8) that results in the hitch angle y approaching the jackknife angle γ(j), the path $C_2$ will continue turning in the same direction relative to the vehicle 14 for a significant distance when the vehicle 14 is steered to attempt to change the direction of the trailer 12 (which may be referred to as the "recovery distance" through which the combination of vehicle 14 and trailer 12 must travel to zero the hitch angle to make possible the change in direction of the curvature $κ_2$). This is because the relatively longer trailer 14 requires a large steering angle d from the vehicle 14 to change the direction of the trailer 12 at high hitch angles γ. As mentioned above this can become a problem if the driver needs to change the direction of the trailer 12 multiple times within a limited amount of lateral space relative to the vehicle 14 stating point, making it desirable to prevent a driver from inadvertently commanding a curvature κ that, while possibly recoverable by continued backing, requires a recovery distance greater than what may be available. On the other hand, because longer trailers 12 have a higher value for the maximum controllable hitch angle $\gamma_{max}$, which provides a greater range of controllable hitch angles γ, it may be beneficial to allow the driver to command a curvature that requires a long recovery period but still maintains the hitch angle γ below the maximum controllable hitch angle $\gamma_{max}$, when, for example, the driver determines that adequate recovery space, or room to drive forward, is available. In this manner, controller 28 is configured to provide the above-mentioned normal operating mode and corresponding curvature κ limit to maintain a sufficiently-low recovery distance. Further, controller 28, by way of HMI 80 for example, can allow the driver to select the advanced mode, wherein, by one of a particular scheme discussed further below, a tighter curvature κ corresponding with a higher hitch angle γ and requiring a longer recovery distance may be commanded and implemented up to the maximum controllable hitch angle $\gamma_{max}$.

In general, controller 28 can generally determine a maximum degree of steady-state curvature that a vehicle 14 and trailer 12 combination can maintain, given the length D of the particular trailer 12 coupled with vehicle 14 (given that other characteristics of vehicle 14, including the maximum steering angle δ, wheelbase W, drawbar length L, etc., which are generally known and unchanging with respect to the particular vehicle 14 in which system 10 is included). In other words, controller 28 can determine a maximum curvature κ that corresponds with a steady-state maneuver of the vehicle 14 and trailer 12 combination at a maximum controllable hitch angle $\gamma_{max}$ at a low vehicle speed. Controller 28 can then derive a range of curvature, from zero (i.e. straight backing) to the determined maximum, and can assign this range to the range of movement of knob 30, which, as shown, is rotation between the at-rest position P(AR) and the end points of rotation (R(R) and R(L), as shown in FIG. 5). Similar assignment can be made with respect to a joystick, a slider, or the like, which may be used to control a vehicle 14 and trailer 12 combination in a manner similar to that which is described herein.

Figure 9:
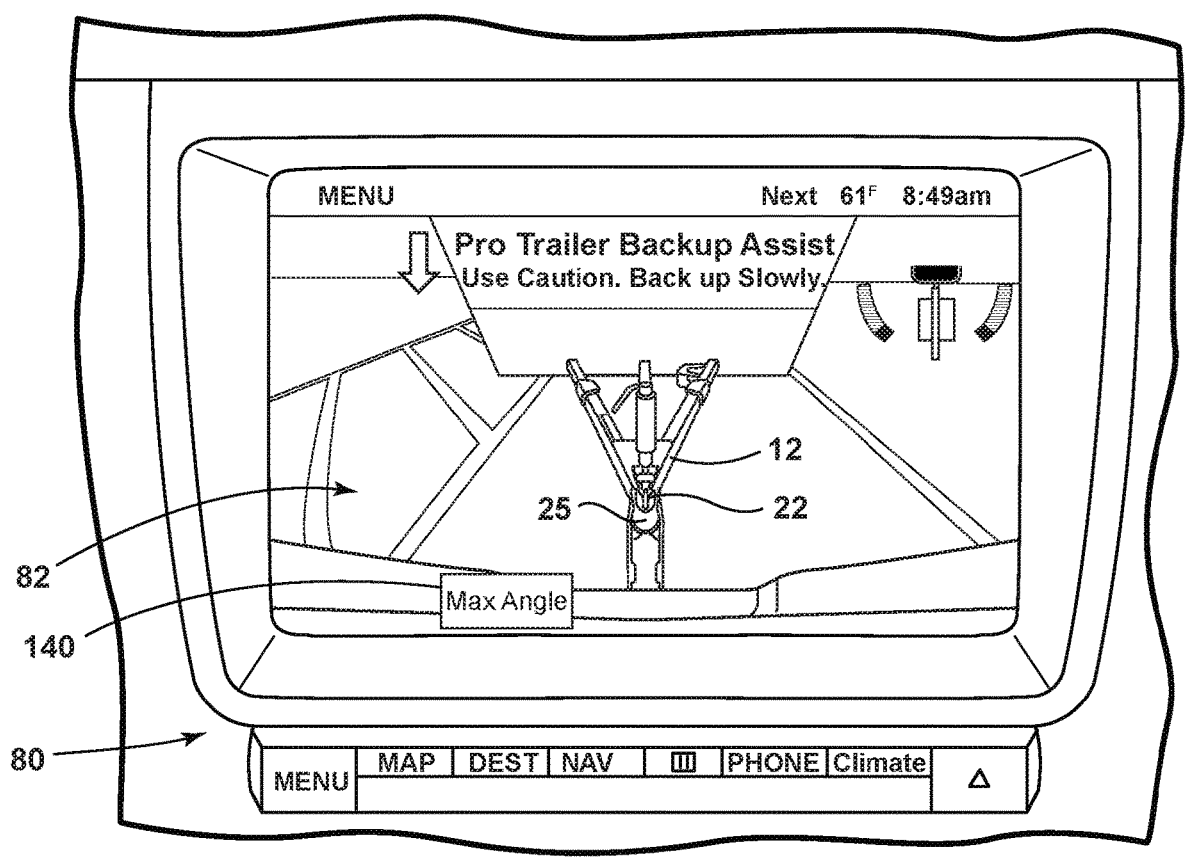
FIG. 9 is a front-perspective view of a vehicle human-machine interface indicating a mode of operation according to an aspect of the disclosure.

By assigning a set range of rotation, such as that which is employed by knob 30 as presently described, in a linear manner, a sub-range within the above-described ranges of motion R(R) and R(L) can correspond proportionately to a particular normal curvature limit. In this manner, when system 10 is operating in the normal mode, further movement of knob 30 past such limit (i.e. out of the normal range) may be, for example, disregarded by controller 28, which may instead maintain the curvature at the normal maximum curvature wile knob 30 is at or pas the assigned limit. As shown in FIG. 9 controller 28 can be programmed to output an indication 140 on HMI 80 that the curvature κ corresponds with a maximum hitch angle γ for the current mode. Accordingly, the location normal curvature limit within the overall ranges of motion R(R) and R(L) can be positioned to correspond with a consistent proportion of the overall curvature determined by controller 28 for which the above-described indication of a "max angle" will be presented and to, accordingly, separate the overall arranges of motion R(R) and R(L) into the "normal" and "advanced" modes and corresponding ranges of allowable curvature K and corresponding hitch angles γ. The proportion of sub-ranges can vary according to various considerations, including the overall responsiveness of system 10 and the length of recovery for which an indication or action is desired.

Because, generally speaking, system 10 will permit a lower degree of curvature κ for longer trailers, while permitting a higher degree of curvature κ for shorter trailers, and because longer trailers have longer recovery distances for comparatively similar curvatures, the proportion of curvature available within the normal mode and the advanced mode will vary by the length D of the trailer 12 being backed. In various embodiments, the above-described normal curvature limit can correspond to a recovery length of about three lengths of vehicle 14 (+/−one-half of a length of vehicle 14), for example. On the other hand, shorter trailers 12 have a lower maximum controllable hitch angle $\gamma_{max}$. As a consequence, for shorter trailers 12, there may not be an appreciable difference between the normal curvature limit and an advanced mode limit and, in some instances, the limit determined based on the maximum controllable hitch angle $\gamma_{max}$ may be lower than that which is determined based on turn recovery distance. Accordingly, as an initial operational step, controller 28 may first determine if the advanced mode is available or should be presented to the user (i.e. to avoid confusion when the additional control provided by the advanced curvature limit is hard to determine for the driver).

In various embodiments, controller 28 can determine the proportionality of the mapping of available curvature κ (i.e. to maintain the hitch angle γ below the maximum controllable hitch angle $\gamma_{max}$) to the range of motion for knob 30 according to various factors, particularly relevant for "conventional" trailers (i.e., those coupled with the vehicle at a hitch ball adjacent to or beyond the rear bumper, as depicted in FIG. 1), including trailer length D, drawbar length L, and others, and may determine if the proportionality is different enough by a predetermined threshold (i.e. a predetermined percentage distance in curvature K, such as between 10% and 25% or the like, or a fixed difference in corresponding maximum hitch angles γ, such as between 5° and 15°). In another example, controller 28 may employ a lookup table proving appropriate mapping characteristics based on such measurements. In a further example where drawbar length L is known and/or the only factor considered is trailer length D, such a lookup table can include mode availability and mapping data dependent on the trailer length D. In such an example, controller can use set lengths D corresponding with advanced mode availability and corresponding control mapping combined with interpolation between adjacent limits to fine tune controls for the particular trailer 14 and corresponding length D.

In a specific, non-limiting example, the lookup table may designate a conventional trailer 12 as one of "short", "medium", or "long" by the associated length D, in which, for example a trailer 12 with a length D less than eight feet can be designated short, a trailer 12 with a length D greater than 15 feet being designated as long, and any trailers in between being designated as medium. Corresponding maximum controllable hitch angles $\gamma_{max}$ can be associated with the trailer 12 depending on its length, with short trailers being assigned a maximum controllable hitch angle $\gamma_{max}$ of 20°, medium trailers 40°, and long trailers 75°. As discussed above, these values can be mapped to the ranges R(R) and R(L) for knob 30 based on the corresponding steady-state curvature values resulting in such angles. As also discussed above, controller 28 can interpolate to derive more precise maximum controllable hitch angles $\gamma_{max}$ and corresponding curvature limits. Notably, the normal curvature limits for the short and medium trailers, designated thusly, may be approximately the same as the maximum controllable hitch angles $\gamma_{max}$, meaning that an advanced mode would not be available for trailers 12 corresponding with those lengths D. For long trailers, the normal curvature limit may correspond with an angle of about 45°, offering a significant angle above such a limit to be provided as an advanced mode. While the particular criteria used to select the normal limit may vary, such that varying lengths may correspond with a long trailer, a trailer generally considered as long would be one type of trailer for which an advanced mode is available. Additionally, gooseneck, or fifth-wheel, trailers 12 are controllable up to the collision angle $\gamma_c$, such that, regardless of the length thereof, an advanced mode may also be available for trailers of this type.

Figure 10:
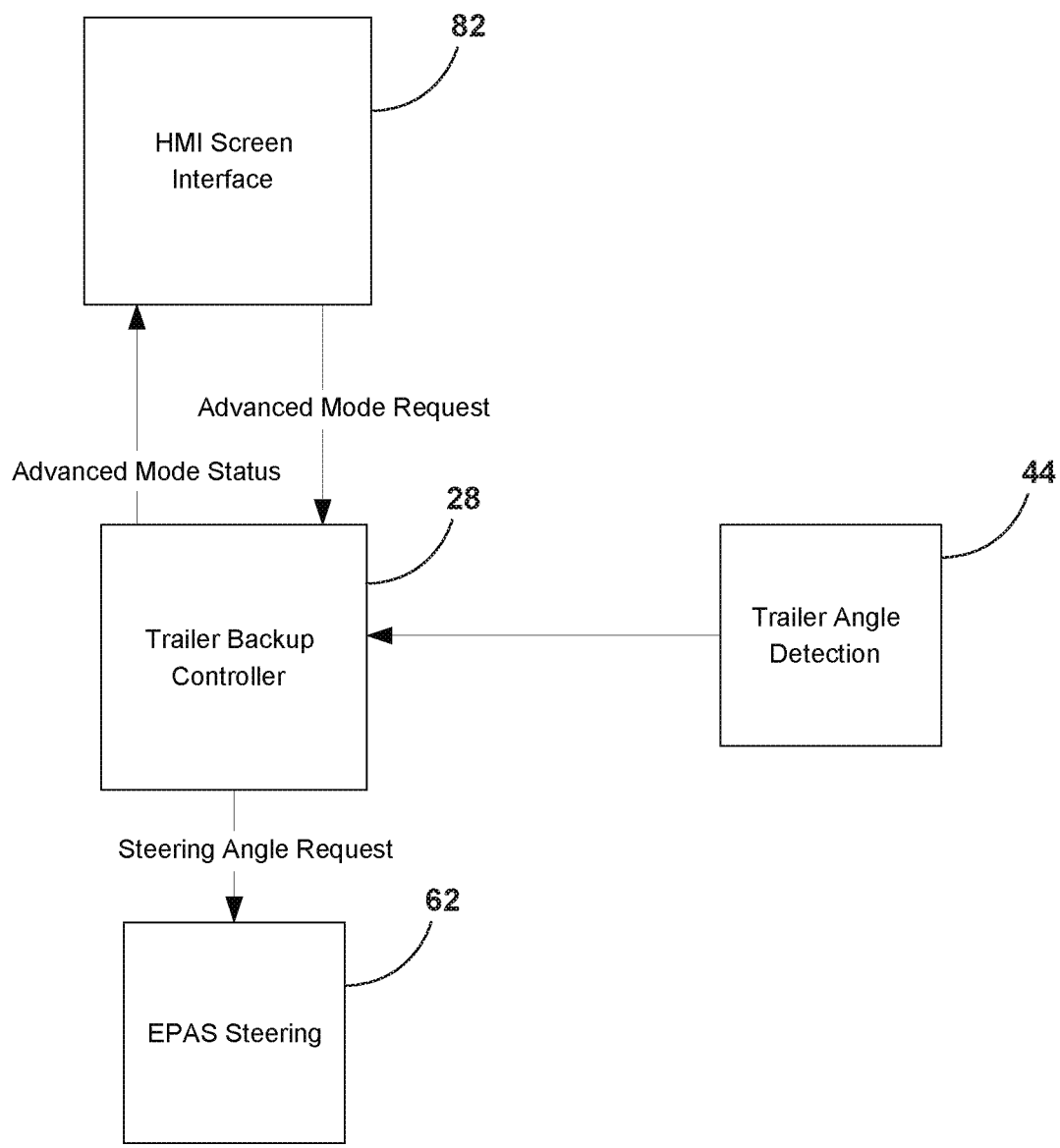
FIG. 10 is a simplified system diagram depicting relevant portions for determining and activating an advanced mode operating scheme.
Figure 11:
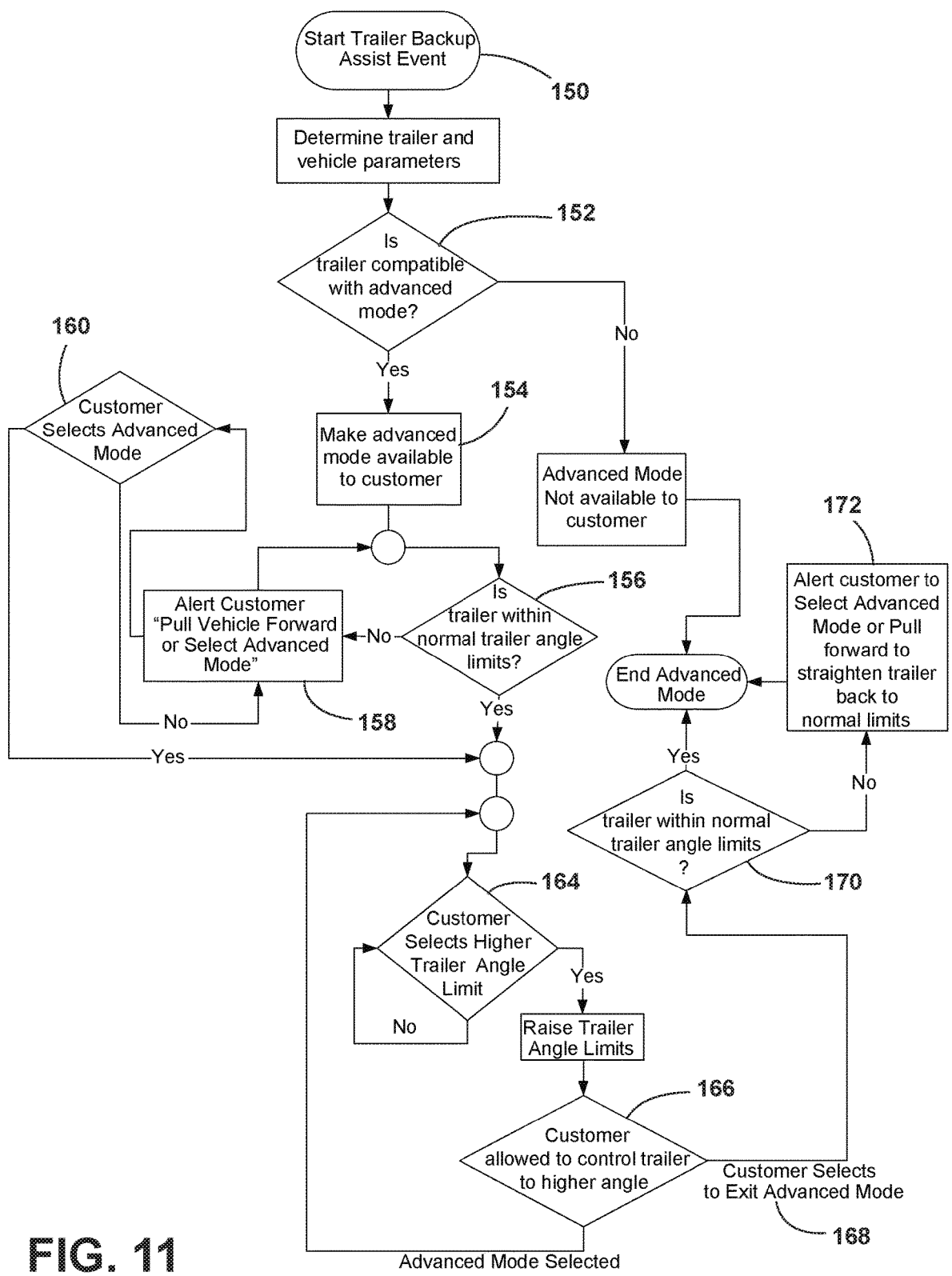
FIG. 11 is a flowchart depicting logic and workflow for determining advanced mode availability, activating the advanced mode, and operating in the advanced mode.

As such, regardless of the amount of curvature κ permitted by controller 28 to maintain the hitch angle γ below the maximum controllable hitch angle $\gamma_{max}$, system 10 may provide an indication that the commanded curvature κ corresponds with a maximum angle for the set mode (normal or advanced), with the mode being set or selectable according to various embodiments of system 10, as shown in a simplified form in FIG. 10 corresponding with the presently-relevant components and sub-systems. In one embodiment, illustrated in FIG. 11, system 10, as discussed above, after activation 150 initially determines 152 whether the trailer 12 coupled with vehicle 14 is compatible with offering an advanced mode. If available, the advanced mode is made available 154 to the user, such as by a virtual button 140 in HMI 80, as shown in FIG. 9 or as otherwise discussed below. Just after making the advanced mode available, controller 28 determines 156 if the instantaneous hitch angle γ is within the range of hitch angles corresponding with the normal limit, as determined by the process and criteria discussed above. If the hitch angle γ is above the normal limit, the driver is instructed 158, via HMI 80, to either select the advanced mode or to drive the vehicle 14 forward. If the user selects 160 the advanced mode, the controller 28 operates in the advanced mode by raising 162 the hitch angle limit and the corresponding curvature K selectable using knob 30.

In one embodiment, the hitch angle limit is set at the maximum controllable hitch angle $\gamma_{max}$ in this step. In such operation, the user may be presented with a simple virtual button 140 (FIG. 9) on HMI 80 that can be shaded according to one scheme (i.e. grey or faded out) to indicate that the advanced mode is not selected and another scheme (i.e. illuminated appearance, blue, etc.) to indicate that the advanced mode is active upon the user touching display 82 in the area of button 140. Alternatively, the user may be presented with a message 240, shown in FIG. 12, with indications 242 and 244 relating to operation in the normal mode and the advanced mode, respectively. The indications may correspond with the selection of the relevant mode using one or more physical buttons or inputs associated with HMI 80. In one aspect, the selection may be made by aligned physical buttons or by tilting of knob 30.

Figure 12:
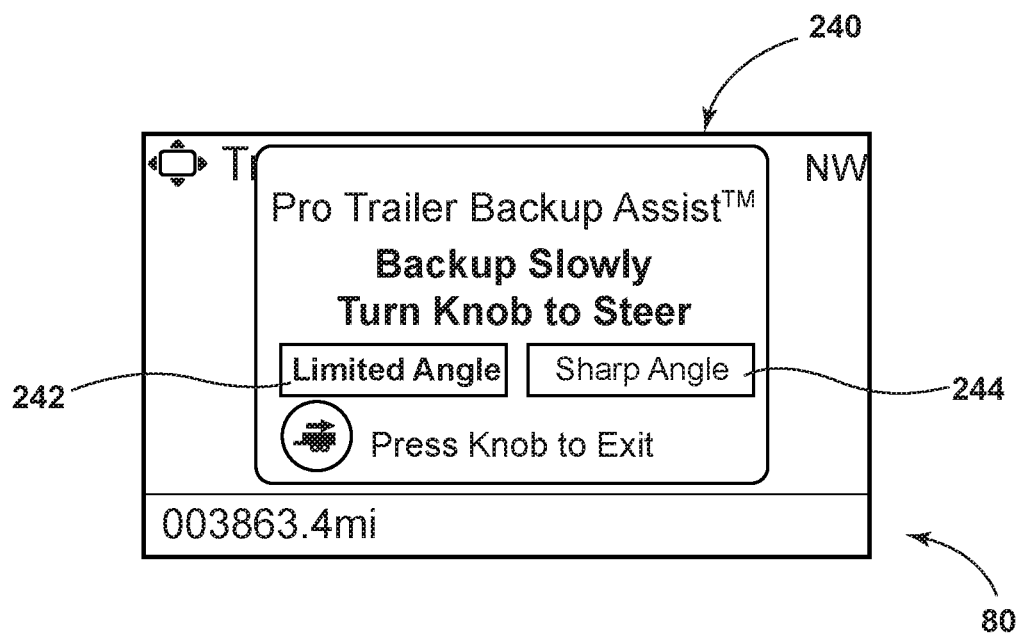
FIG. 12 is an alternative operation mode indication presentable on the vehicle human-machine interface.
Figure 13:
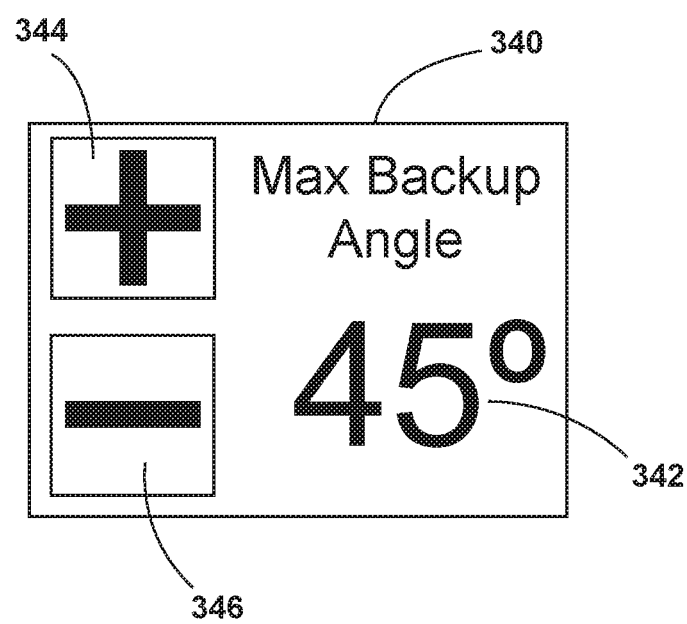
FIG. 13 is a further alternative operation mode indication presentable on the vehicle human-machine interface.

It is noted with respect to FIGS. 9 and 12 that the particular verbiage associated with the normal and advanced modes, but may simply be related to the character of the curvature κ or hitch angle γ allowed within the associated mode of operation, such as whether a "max angle" is selectable or whether a "limited angle" or a "sharp angle" can be called for. In another embodiment, shown in FIG. 13, the user may be able to select 164 a higher hitch angle, such as by presentation of a selection interface 340 that includes an angle indication 342 of a specific value that may be adjustable from the normal limit to, for example, the maximum controllable hitch angle $\gamma_{max}$.

Continuing with respect to FIG. 12, whether the hitch angle γ limit is raised automatically by controller 28 or by user input 164, controller 28 be allowed 166 to control the curvature κ up to the point that the higher, advanced hitch angle γ or curvature κ limit is reached until either the backup sequence is ended or the advanced mode is deselected 168. Notably, when the advanced mode is deselected by the user, the controller 28 must again determine 170 whether the instantaneous hitch angle γ is within or above the normal angle limit. If the hitch angle γ is within the normal range, controller 28 continues to operate within the lower range until the advanced mode is reselected 160. If the hitch angle γ is above the normal limit, the driver is then alerted 172, via HMI 80, to reactivate the advanced mode or to drive the vehicle 14 forward.

Figure 14:
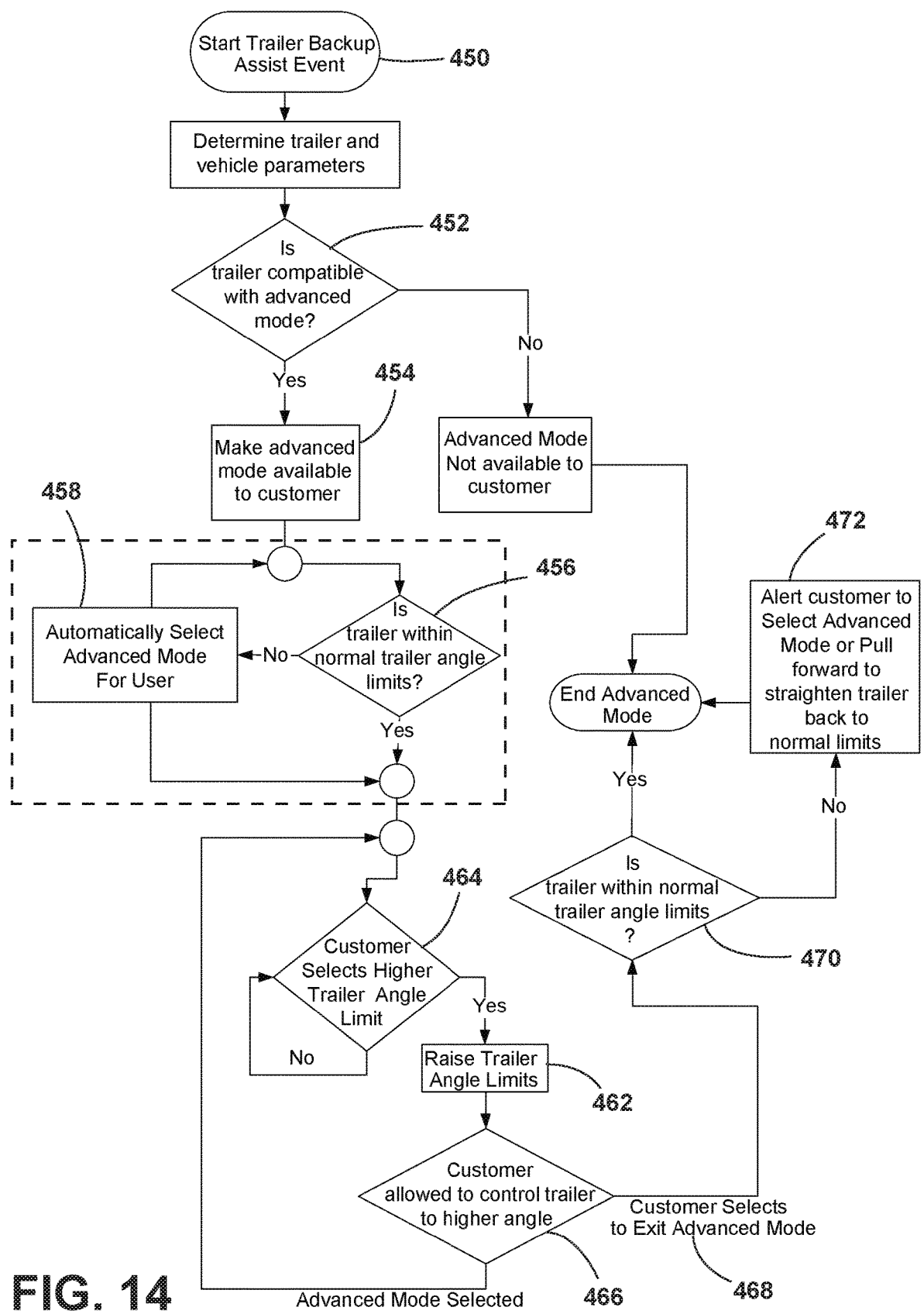
FIG. 14 is a flowchart depicting alternative logic and workflow for determining advanced mode availability, activating the advanced mode, and operating in the advanced mode according to another embodiment.

Turning to FIG. 14, a variation of the advanced mode selection and implementation scheme is depicted in which the advanced mode is automatically selected 458 when needed and available. In particular, controller 28, upon activation of operating routine 132, determines 452 whether the trailer 12 coupled with vehicle 14 is compatible with offering the advanced mode. If possible, the advanced mode is made available 454 to the user, such as by a selectable item 140 in HMI 80, as shown in FIG. 9 or as otherwise discussed above. As above, just after making the advanced mode available, controller 28 determines 456 if the instantaneous hitch angle γ is within the range of hitch angles corresponding with the normal limit, as determined by the process and criteria discussed above. If the hitch angle γ is above the normal limit, the advanced mode is automatically selected 458, with appropriate indication being given to the driver via HMI 80. If the hitch angle is within the normal range, controller 28 waits for the user to select 460 the advanced mode, before the controller 28 operates in the advanced mode by raising 462 the hitch angle limit and the corresponding curvature K selectable using knob 30. In a similar manner to that which is discussed above with respect to FIG. 12, until the user deselects or otherwise ends 468 the advanced mode, including determining 470 whether operation is possible after ending without reactivation or forward driving.

Figure 15:
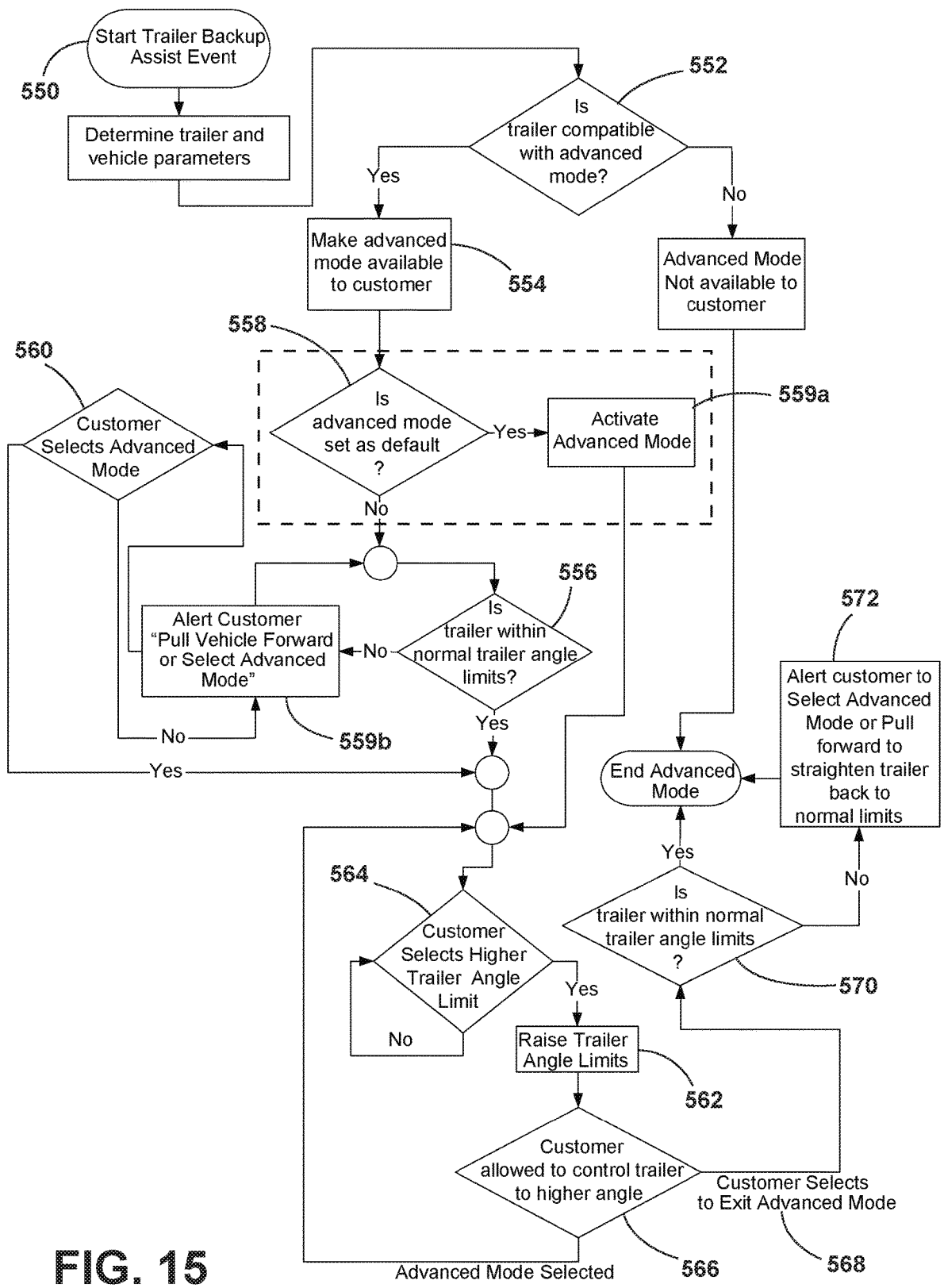
FIG. 15 is a flowchart depicting further alternative logic and workflow for determining advanced mode availability, activating the advanced mode, and operating in the advanced mode according to another embodiment.

A further variation of an advanced mode selection and implementation scheme is depicted in FIG. 15, in which the user can select a default mode for initial operation. In one example, the default mode may be a selectable system setting with a vehicle options selection menu or within a particular menu associated with system 10, including in a routine that allows user input of the trailer 12 and/or vehicle 14 parameters by way of HMI 80. In the use of such a scheme, controller 28, as discussed above, determines 552 whether the trailer 12 coupled with vehicle 14 is compatible with offering the advanced mode. If possible, the advanced mode is made available 554 to the user, such as by a selectable item 540 in HMI 80, as shown in FIG. 9 or as otherwise discussed above. Just after making the advanced mode available, controller 28 determines 558 the default mode and automatically selects 559a the advanced mode if the advanced mode is the default. If the advanced mode is not the default, controller 28 determines 556 if the instantaneous hitch angle γ is within the range of hitch angles corresponding with the normal limit, as determined by the process and criteria discussed above. If the hitch angle γ is above the normal limit, the. If the advanced mode is not the default, the driver is instructed 559b, via HMI 80, to either select the advanced mode or to drive the vehicle 14 forward, with appropriate indication being given to the driver via HMI 80. If the hitch angle is within the normal range, controller 28 waits for the user to select 560 the advanced mode, before the controller 28 operates in the advanced mode by raising 562 the hitch angle limit and the corresponding curvature K selectable using knob 30. In a similar manner to that which is discussed above with respect to FIG. 12, until the user deselects or otherwise ends 568 the advanced mode, including determining 570 whether operation is possible after ending without reactivation or forward driving.

Figure 16:
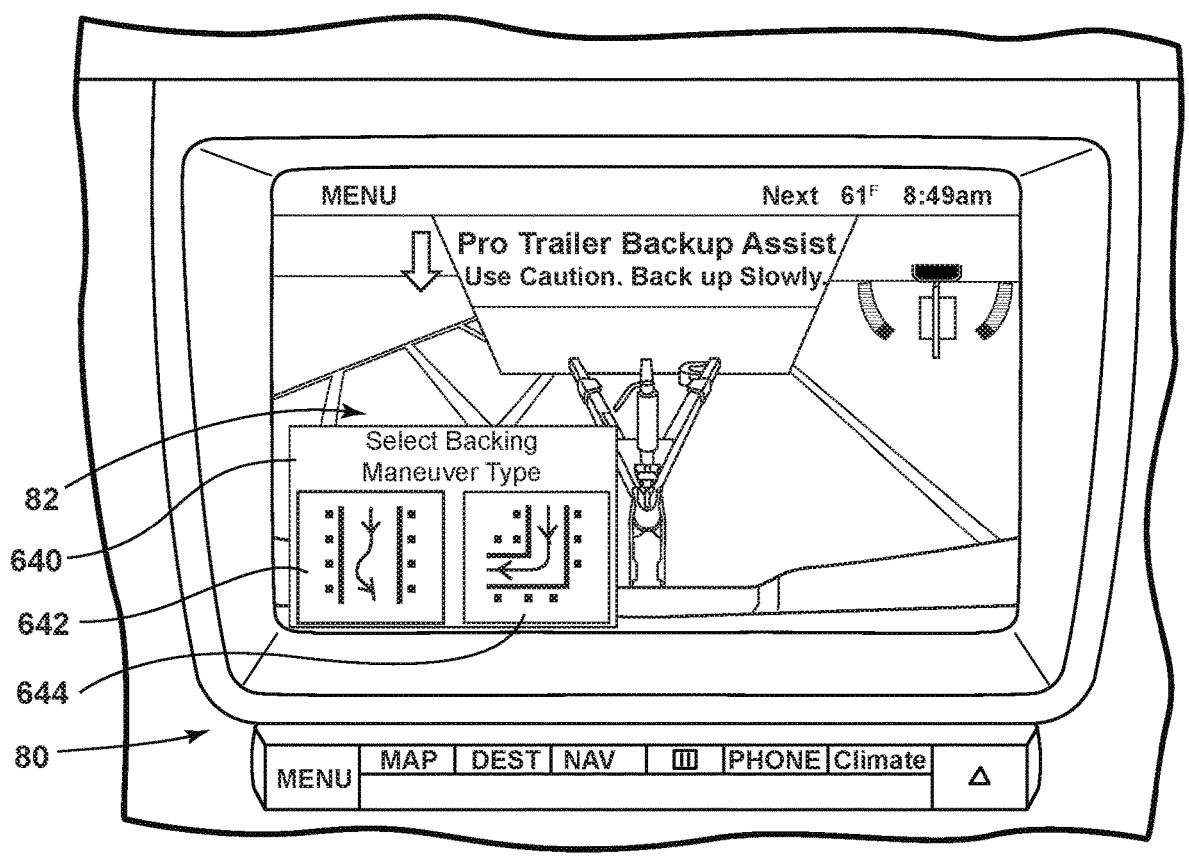
FIG. 16 is a front-perspective view of an alternative vehicle human-machine interface indicating a mode of operation according to a further aspect of the disclosure.

As shown in FIG. 16, in an alternative embodiment, the operation between the above-described normal and advanced mode, regardless of the particular implementation scheme, can be characterized in terms of the type of turn. As shown, the interface item 640 presented in such an embodiment can include depictions of "maneuver types" respectively indicating movement of the vehicle 14 and trailer 12 combination within a restricted area 642 or within an overall singular direction that may require recovery of the hitch angle γ between successive maneuvers and a cornering maneuver 644 in which the direction of trailer 14 is changed, thereby requiring rezeroing of the hitch angle γ, but not a change of direction that would make the recovery length problematic. Such a selection mode can be used in connection with any of the above-described schemes with the restricted area 642 indication relating to the normal mode operation and the cornering indication 644 relating to the advanced mode operation.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A backup assist system for a vehicle reversing a trailer, comprising:
   a controller:
      receiving a driver control signal; and
      outputting a vehicle backing steering command based on the control signal and limited by one of a first angle limit corresponding with a calculated maximum controllable angle and a second angle limit at a maneuverability threshold below the maximum controllable angle, wherein the controller causes the system to selectively operate in a normal mode wherein the backing steering command is limited by the second angle limit and an advanced mode wherein the backing steering command is limited by the first angle limit; and
   an interface outputting an indication of the one of the first and second angle limits.

2. The system of claim 1, further including an input receiving a backing control command from a driver and outputting the driver control signal based thereon on the backing control command.

3. The system of claim 1, wherein:
   the control signal includes a direction and an amplitude; and
   the controller interprets the amplitude as a curvature command in the direction indicated by the control signal.

4. The system of claim 1, wherein the controller receives, by way of the interface, a user selection of one of the normal mode and the advanced mode.

5. The system of claim 4, wherein:
the interface presents softbuttons corresponding with each of the normal mode and the advanced mode; and
outputs a selection of one of the normal mode or the advanced mode to the controller upon an input corresponding with the respective softbutton.

6. The system of claim 5, wherein:
the controller initially determines whether operation of the system in the advanced mode is desirable based on predetermined criteria; and
the interface indicates that the softbutton corresponding with the advanced mode is not selectable when the controller initially determines that operation of the system in the advanced mode is not desirable.

7. The system of claim 4, wherein:
the interface presents an indication of a current operation mode from either of the normal mode and the advanced mode; and
the controller receives a selection of the other of the normal mode and the advanced mode by at least one physical control in the vehicle.

8. The system of claim 4, wherein:
the second limit is adjustable by a user within a predetermined range; and
the interface presents an indication of the second limit and respective softbuttons for raising or lowering the limit within the predetermined range.

9. The system of claim 1, wherein the controller restricts operation of the system to within the normal mode unless the trailer meets at least one predetermined criterion.

10. The system of claim 9, wherein the predetermined criterion is one of a length of the trailer being above a threshold conventional trailer length or a type of the trailer corresponding with a gooseneck trailer.

11. The system of claim 1, wherein when the system operates in the normal mode and an initial vehicle-trailer angle is above the second angle limit, the interface presents a prompt to drive the vehicle in a forward direction or to select the advanced mode.

12. The system of claim 1, when an initial vehicle-trailer angle is above the second angle limit, the control system interface selects to operate in the advanced mode.

13. The system of claim 1, wherein the controller designates one of the normal mode and the advanced mode as a default mode that it selectively operates in upon activation of the system, the designation being determined by a user via the interface.

14. A backup assist system for a vehicle reversing a trailer, comprising:
a controller:
receiving a driver control signal; and
operating in one of a normal mode and an advanced mode in which:
in the advanced mode the controller outputs a vehicle backing steering command based on the control signal and limited by a first angle limit corresponding with a calculated maximum controllable angle; and
in the normal mode the controller outputs the vehicle backing steering command based on the control signal and limited by a second angle limit at a maneuverability threshold below the maximum controllable angle; and
an interface outputting an indication of the one of the first and second angle limits.

15. The system of claim 14, wherein the controller receives, by way of the interface, a user selection of one of the normal mode and the advanced mode.

16. The system of claim 14, wherein the controller restricts operation of the system to within the normal mode unless the trailer meets at least one predetermined criterion.

17. The system of claim 14, wherein when the system operates in the normal mode and an initial vehicle-trailer angle is above the second angle limit, the interface presents a prompt to drive the vehicle in a forward direction or to select the advanced mode.

18. The system of claim 14, when an initial vehicle-trailer angle is above the second angle limit, the control system interface selects to operate in the advanced mode.

19. A method for assisting in reversing a vehicle-trailer combination, comprising:
receiving a driver control signal;
controlling reversing the vehicle-trailer combination in one of a normal mode and an advanced mode in which:
in the advanced mode, controlling reversing includes outputting a vehicle backing steering command based on the control signal and limited by a first angle limit corresponding with a calculated maximum controllable angle; and
in the normal mode, controlling reversing includes outputting the vehicle backing steering command based on the control signal and limited by a second angle limit at a maneuverability threshold below the maximum controllable angle; and
presenting an indication of the one of the first and second angle limits to a driver of the vehicle.

20. The system of claim 1, wherein:
the interface is a video screen included within a vehicle human-machine interface; and
the indication of the one of the first and second angle limits is made graphically on the video screen.

* * * * *